United States Patent Office 3,364,281
Patented Jan. 16, 1968

3,364,281
DYEABLE CRYSTALLINE POLYOLEFIN
COMPOSITIONS
Tsuyoshi Saito, Hyakunin-cho, Shinjuku-ku, Tokyo, Motonobu Sato, Minami-cho, Nerima-ku, Tokyo, and Osamu Irie, Seijo-Machi, Setagaya-ku, Tokyo, Japan, assignors to Kureha Kasei Kabushiki Kaisha, Tokyo, Japan
No Drawing. Filed Mar. 1, 1961, Ser. No. 92,456
Claims priority, application Japan, Mar. 8, 1960, 35/7,105; May 13, 1960, 35/24,021; July 18, 1960, 35/31,362; July 27, 1960, 35/32,607; Dec. 12, 1960, 35/48,246
10 Claims. (Cl. 260—873)

The present invention relates to crystalline polyolefin compositions which can be converted into fabricated materials such as fibre, film, etc. having improved properties. More particularly, the present invention relates to improvements of dyeability, waxy feeling, creep, printability, etc., which are defects of synthetic fibre made from polyolefin.

Generally speaking, fabricated materials made from crystalline polyolefin show very superior properties because of the chemical and structural character of a starting polyolefin, but in case polyolefin has been converted particularly into synthetic fibre, the aforesaid character shows almost no affinity to dyestuff or pigment. Therefore, it is impossible to dye said synthetic fibre with an ordinary dyestuff and by an ordinary dyeing method. This fact greatly hampered the development of synthetic fibre as textile fibre. This fact is regrettable in view of the cheap price, lightness, superior mechanical property and elasticity of crystalline polyolefin type fibre, especially polypropylene fibre.

As a process for improving the aforesaid defects and manufacturing a polyolefin polymer which can be dyed, it is firstly considered to modify basic olefin by the copolymerizing or graft-polymerizing of a substance which has an active group having affinity with dyestuff and basic olefin. This process was very effective in improving the quality of polyacrylonitrile type synthetic fibre, but there is a problem in polymerization of olefin, and even if the olefin can be copolymerized, it is anticipated that because of the non-polarity of polyolefin only very little can be expected from the dyeability of the obtained fibre as compared with the polar property of acrylonitrile, which is the main component of the aforesaid synthetic fibre, in view of $\zeta$ potential.

The second process is to treat crystalline polyolefin with ionizing radioactive rays or under other violent conditions to improve the terminal group of crystalline polyolefin or to graft-polymerize substance having dyeable group but this process also has some problems concerning price and operation.

The third process is to mix a substance which will give a dyeability to crystalline polyolefin and then mold or extrude them.

The present invention relates to the said third process. We found substances as a result of searching that will not give any hindrance when melt-extrusion or melt-spinning, which is a common fabricating method for crystalline polyolefin. The substances have dyestuff-acceptability and will not cause separation from poleyolefin. These substances that we have found are polycarbonate type resin, styrene polymer resin, polyester type resin and polymethacrylic type resin. The purpose of the present invention is to offer the dyeable composition for crystalline polyolefin fibre and film, having the aforesaid improved properties including dyeability by adding resin selected from polycarbonate type resin, styrene polymer resin, polyester type resin and polymethacrylic type resin to crystalline polyolefin resin, mixing them in the molten state, and conducting melt-spinning or melt-extrusion.

The polycarbonate type resins which may be suitably used in the present invention are those which are obtained by polycondensating 4,4'-dioxy-diphenyl alkane with diphenyl carbonate or 4,4'-dioxy-diphenyl alkane with phosgene—or broadly speaking, the reaction of a diphenyl alkane and carbonyl compound.

As the aforesaid 4,4'-dioxy-diphenyl alkane, for example, the following susbtances are used:

4,4'-dioxy-diphenyl-1,1-ethane
4,4'-dioxy-diphenyl-1,1-butane
4,4'-dioxy-diphenyl-1,1-isobutane
4,4'-dioxy-diphenyl-1,1-cyclopentane
4,4'-dioxy-diphenyl-1,1-cyclohexane
4,4'-dioxy-diphenyl-1,1-phenylmethane
4,4'-dioxy-diphenyl-2,2-propane (Bisphenol A)
4,4'-dioxy-diphenyl-2,2-pentane
4,4'-dioxy-diphenyl-2,2-methylisobutylmethane
4,4'-dioxy-diphenyl-2,2-hexane
4,4'-dioxy-diphenyl-2,2-nonane
4,4'-dioxy-diphenyl-2,2-methylphenylmethane
4,4'-dioxy-diphenyl-4,4-pentane
4,4'-dioxy-diphenyl-1,2-ethane
4,4'-dioxy-3,3-dimethylphenyl-2,2-propane And as a product on the market, polycarbonate resin known as Markrolon (Bayer), Lexan (G.E.), is used. The term "polycarbonate resin" as used in the specification and claims is to be construed as including the above polymers.

As the styrene polymer resin which may be used in the present invention, there are mentioned polymers of styrene, methylstyrene, dimethylstyrene, halogenated styrene and the like and their interpolymers, and copolymers which contain more than 50% of aforesaid styrene type monomers with acrylonitrile, butadiene, acrylic ester, methacrylic ester, vinyl ester, vinyl ether, acrolein and other vinyl monomers.

Polyester type resin which may be used in the present invention is a condensation polymer of alkylene glycol and terephthalic acid or its ester forming derivatives. The alkylene glycol is lower glycol such as ethylene glycol, propylene glycol, 1,4-butanediol, cyclohexanediol, 1,5-pentanediol, 1,6-hexanediol, etc. Terephthalic acid may be partially displaced with other dibasic acids such as isophthalic acid, adipic acid, sebacic acid, azelaic acid and the like. It has been discovered that if less than 50% of isophthalic acid is added to terephthalic acid, an increase of dyeability will rather be brought about. The term "polyester resin" as used in the specification and claims is to be construed as including the above polymers.

The polymethacrylate type resin which may be used in the present invention are polymers of methyl methacrylate, ethyl methacrylate, butyl methacrylate, methacrylic acid, methacrylic amide, propyl methacrylate and the like and their interpolymers, and copolymers of them with styrene, methylstyrene, dimethylstyrene, halogenated styrene, vinyl acetate, acrylic ester and the like. The term "polymethacrylate resin" as used in the specification and claims is to be considered as including the above polymers, copolymers and interpolymers.

Resin which is to be added to crystalline polyolefin in the present invention is limited in view of the high fabricating temperature of polyolefin, not to decompose markedly at melt-extrusion or spinning.

The quantity of synthetic resin to be added is 1 to 20 parts, preferably 1 to 10 parts against 100 parts of polyolefin. If the quantity of synthetic resin is less than 1 part, the purpose of the present invention cannot be attained. If the quantity of synthetic resin is within the range of 1 to 20 parts, fabricating conditions are not affected and there is no affect upon the mechanical property of products. If the quantity of synthetic resin is more than 20 parts, it will make fabricating processing somewhat difficult, and moreover will adversely affect the desirable mechanical properties which are the characteristic of crystalline polyolefin.

It has been proved by the X-ray diagrams of fibres obtained from the present invention that the added resin does not to any great extent participate in the crystalline part of the polyolefin. Accordingly, the added resin disperses in amorphous part of crystalline polyolefin and prevents molecular orientation somewhat, and therefore fibre made from crystalline polyolefin alone has not absorbed disperse dyestuff, while fibre obtained from the composition of the present invention can be dyed by ordinary methods. In view of this fact, it is considered that molecular orientation is prevented by addition of resin and at the same time micell gaps in the amorphous area of fibre have become greater and consequently permeation of dyestuff molecules has become easier.

The advantage of which resin is added in the present invention is not only the aforesaid improvement of dyeability but also the points that creep characteristic which is a defect of high density polyethylene fibre has been improved, and that waxy feeling has been reduced greatly. Moreover, in case it has been produced into film, etc., printability has been improved.

The second purpose of the present invention is to further improve the dyeability of fibre, particularly polypropylene fibre. As aforesaid, fibre obtained from resin blended composition can be dyed easily by disperse dyestuff, but its fastness cannot be said to be sufficient. As a result of investigations, we added polycarbonate type resin and polymethacrylic type resin to crystalline polyolefin, particularly polypropylene and mixed them in the molten state and converted to fibre, this fibre can be fast and thickly dyed not only by disperse dyestuff but also by naphthol dyestuff, vat dyestuff, soluble vat dyestuff and sulfur dyestuff without depending on particular dyeing apparatus and method. It is difficult to explain the mechanism as to why fibre fabricated from these compositions is dyed by the aforesaid dyestuff, but it means the defect of crystalline polyolefin, particularly polypropylene fibre, has been eliminated that these are dyed by dyestuff for cotton and have come to superior fastness, and this contributes greatly to the development of the present fibre.

The aforesaid composition which is dyed by cotton dyestuff is not only blending of polycarbonate and polymethacrylic type resin to polyolefin, but also another substance as following Table I.

The present invention is further illustrated by the following examples.

Example 1

7 parts of polycarbonate resin made from condensate of phosgene and 4,4'-dioxydiphenyl-2,2'-propane was added to 100 parts of polypropylene (melt-index 6), and the mixture was melted and spun at the temperature of 250° C. and was stretched by 4.5 times. This fibre had a strength of 5.1 g./d. and an elongation of 25% at 3 denier and had good dyeability at 100° C. by disperse dyestuff and showed 4 to 5 class dyeing fastness.

Example 2

5 parts of polycarbonate resin manufactured from 4,4'-dioxydiphenyl-1,1-butane and phosgene was added to 100 parts of poly-1-butene (melt-index 2.5), the mixture was melted and spun at the temperature of 235° C. and was stretched by 3.8 times. The fibre thus obtained had a strength of 3.2 g./d. and an elongation of 17% at 4.5 denier and showed good dyeability in dyeing by disperse dyestuff through a conventional method, and its dyeing fastness was also good.

Example 3

15 parts of polycarbonate resin synthesized by ester interchange reaction between diphenylcarbonate and Bisphenol A was added to 100 parts of low pressure method polyethylene [specific gravity 0.95 (melt-index 2.0)], and the mixture was melted and spun at the temperature of 300° C. by a nozzle having 30 holes of 0.25 mm. diameter, and was stretched by 10 times. An also low pressure method polyethylene was spun under the same conditions without adding polycarbonate resin thereto, and yarn which was stretched to the same extent was manufactured. A comparison between the two fibres is as follows:

| | Denier | Strength (g./d.) | Elongation (percent) |
|---|---|---|---|
| Polyethylene containing polycarbonate | 4.8 | 3.1 | 28 |
| Polyethylene alone | 4.5 | 3.3 | 30 |

The mechanical difference between the two is very little, but as regards affinity to a disperse dyestuff, what was spun alone was almost not dyed, while what contained polycarbonate showed good dyeability.

TABLE I

| No. | Composition | | | |
|---|---|---|---|---|
| 1 | Polyolefin | Polycarbonate type resin. | Polymethacrylate type resin. | |
| 2 | ___do___ | ___do___ | ___do___ | Styrene polymer resin. |
| 3 | ___do___ | ___do___ | ___do___ | Polyester type resin. |
| 4 | ___do___ | ___do___ | Copolymer of methacrylate and styrene. | |
| 5 | ___do___ | ___do___ | ___do___ | Styrene polymer resin. |
| 6 | ___do___ | ___do___ | ___do___ | Polyester type resin. |
| 7 | ___do___ | ___do___ | ___do___ | Polymethacrylate type resin. |

If the added quantity of each of polycarbonate type resin and polymethacrylic type resin is less than part of crystalline polyolefin, the purpose of present invention cannot be attained. In this case the quantity of other resin to be added is not limited. And if the total quantity of resin added is less than 20 parts, spinning conditions and the mechanical property of fibre will be affected little.

The crystalline polyolefin which may be used in the present invention contains polyethylene, polypropylene and poly-1-butene.

The composition of the present invention may be modified further by heat-stabilizer, antioxidant, ultraviolet absorber and colorant.

Example 4

10 parts of the same polycarbonate resin as used in Example 3, was added to 100 parts of polyethylene [specific gravity 0.96 (melt-index 1.0)] made under medium pressure method, and melt-spinning was carried out at the temperature of 280° C. by using a 0.5 mm. nozzle, and then yarn of 250 denier was manufactured after stretching the yarn by 10 times. By the same operation a yarn containing no polycarbonate was manufactured. As in the case of Example 3, there was a marked difference between the two yarns in respect of dyeability, and there was a further marked difference in respect of creep character.

| | Denier | Strength (g./d.) | Elongation (percent) | Creep time (2.8 g./d. load cutting) |
|---|---|---|---|---|
| Polyethylene containing polycarbonate | 260 | 7.0 | 16.0 | 190 |
| Polyethylene | 250 | 7.3 | 14.0 | 50 |

*Example 5*

5 parts of polystyrene (molecular weight 80,000) was added to 100 parts of polypropylene (melt-index 2), and the mixture was melt-spun by a melt-spinning machine at the temperature of 260° C. and was stretched by heat by 5 times.

Likewise, 0.1 part of titanium white was added to 100 parts of polypropylene, and fibre was manufactured from the mixture by the same operation as described above. The comparison between strength and elongation of the two products is as follows:

| Addition agent | Strength (g./d.) | Elongation (percent) |
|---|---|---|
| Polystyrene | 5.43 | 25 |
| Titanium white | 4.55 | 22 |

It is recognized that strength decreased as a result of adding titanium white and that both were same luster.

*Example 6*

By adding 2 parts of copolymer comprising 70 parts of styrene and 30 parts of acrylonitrile to 100 parts of polypropylene (melt-index 2), semidull yarn was manufactured. By adding 0.05 part of titanium white to 100 parts of polypropylene, fibre was manufactured by the same operation as described above.

Both are the same so far as their degree of luster is concerned, but the comparison between them in strength and elongation is as follows:

| Addition agent | Strength (g./d.) | Elongation (percent) |
|---|---|---|
| Copolymer styrene and acrylonitrile | 5.86 | 26.5 |
| Titanium white | 4.86 | 22.3 |

*Example 7*

Monofilament was manufactured by melt-spinning a mixture of 100 parts of polyethylene (melt-index 1.5) and 3.5 parts of polystyrene (molecular weight 60,000) at the temperature of 220° C. and stretching the yarn by 10 times.

In the same manner polyethylene alone was melt-spun. There was not a big difference between the two in respect of strength and elongation, but as a result of measuring creep for a long time, laying a load of 1.2 g./d., the fibre containing polystyrene showed good results.

| Addition agent | Strength (g./d.) | Elongation (percent) | Creep time (hrs.) |
|---|---|---|---|
| Polystyrene | 8.2 | 12.2 | 150 |
| None | 8.1 | 13.5 | 45 |

*Example 8*

100 parts of poly-1-butene (melt-index 3.5) and 5 parts of polystyrene (molecular weight 50,000) were mixed in the molten state and the mixture was melt-spun at the temperature of 195° C. and fibre was obtained, and as a result of stretching the obtained fibre by 4 times, delustered yarn, whose strength was 3.9 g./d. and elongation was 23%, was obtained. This fibre was dyeable by disperse dyestuff through a conventional method, but dyeing of poly-1-butene fibre manufactured under the same conditions was difficult.

*Example 9*

7 parts of polystyrene (molecular weight 50,000) was added to 100 parts of polypropylene (melt-index 4.5), and the mixture was molded into film after carrying out melt-extrusion. Polypropylene alone was manufactured through the same operation. As a result, it was found that the transparency of the mixed film was somewhat lower than that of normal polypropylene film, but both were almost same in respect of mechanical property, and the printability of the former was good.

*Example 10*

Film was made from a mixture of 100 parts of polyethylene (melt-index 0.9) manufactured under medium pressure method and 3 parts of polystyrene (molecular weight 50,000) through an inflation method. Through the same operation, film was made from polyethylene containing no polystyrene. The film containing polystyrene was non-transparent, but no hindrance took place when said film was subjected to printing. On the other hand, the transparency of film made from polyethylene alone was high, but its printability was low.

*Example 11*

10 parts of condensate of ethylene glycol and terephthalic acid was mixed to 100 parts of polypropylene melt-index 2.0), and the mixture was subjected to melt-spinning at the temperature of 280° C. The fibre obtained as a result was stretched 600% and was subjected to orientation by stretching. Fibre was manufactured from polypropylene alone by the same operation. Comparison of the mechanical properties of the two was as follows:

| | Strength (g./d.) | Elongation (percent) | Knot strength (g./d.) | Recovery of elasticity at 5% elongation (percent) |
|---|---|---|---|---|
| Polypropylene alone | 5.5 | 20.5 | 4.6 | 100 |
| Polypropylene containing polyester | 5.3 | 22.0 | 4.5 | 100 |

The effect caused by the addition of polyester resin cannot be recognized from the above table, but, as regards dyeability, the fibre of polypropylene alone absorbed almost no disperse dyestuff, while the mixed fibre of polypropylene containing polyester showed a high dye absorption rate and also a good fastness.

*Example 12*

5 parts of condensate of ethylene glycol and terephthalic acid (containing 50% of isophthalic acid) was added to 100 parts of poly-1-butene (melt-index 2.5), and the mixture was subjected to melt-spinning at the temperature of 210° C. and fabricated to fibre. On the other hand, fibre containing no polyester fabricated by the same operation. Comparison of the mechanical properties of the two which were stretched by 4.0 times is as follows:

| | Strength (g./d.) | Elongation (percent) | Knot strength (g./d.) |
|---|---|---|---|
| Fibre not containing polyester | 3.6 | 19.0 | 2.5 |
| Fibre containing polyester | 3.5 | 21.2 | 2.6 |

The dye absorption rate of the fibre containing polyester was larger than that of the pure poly-1-butene fibre.

*Example 13*

5 parts of condensate of terephthalic acid and cyclohexanediol was added to 100 parts of polypropylene (melt-index 2.0), and the mixture was subjected to melt-spinning at the temperature of 260° C. and was fabricated into fibre and stretched by 5 times. The strength, elongation, knot strength and elasticity of this fibre was 4.9 g./d., 20.4%, 4.7 g./d. and 100% respectively, and there is not much difference between above fibre and pure fibre, but the dyeability of the former was good.

Example 14

5 parts of copolymerized condensate of terephthalic acid containing 30% isophthalic acid and ethylene glycol was added to 100 parts of polypropylene (melt-index 29.5) and fibre was manufactured by subjecting the mixture to melt-spinning at the temperature of 270° C. Then fibre having strength of 7.7 g./d., elongation of 17%, knot strength of 6.3 g./d. and recovery of elasticity of 100% was obtained after the aforesaid manufactured fibre had been stretched by 7 times.

Example 15

Monofilament was made by subjecting a mixture of 100 parts of polyethylene manufactured under medium pressure method (melt-index 1.9) and 7 parts of ethylene glycol-terephthalic acid condensate to melt-spinning at the temperature of 270° C. By the same operation, monofilament was manufactured from polyethylene alone. Both were stretched by 5 times and were subjected to orientation. As a result, fibre containing polyester came to have no waxy feeling, and when said fibre was laid with static load and left as it was, the creep time was longer than pure fibre, that is, marked improvement was made.

|  | Strength (g./d.) | Elongation (percent) | Creep time under 22 g./d. load (hrs.) |
|---|---|---|---|
| Polyethylene | 7.8 | 13.1 | 40-50 |
| Polyethylene-polyester | 8.0 | 11.5 | 100 |

Example 16

3 parts of polymethyl methacrylate was added to 100 parts of crystalline polypropylene (melt-index 2.1), and this was mixed in the molten state, and melt-spinning was carried out by a nozzle of 0.3 mm. diameter at the temperature of 245° C. Then the fibre was stretched by 4.5 times and subjected to orientation. Comparison between this fibre and the fibre of pure polypropylene polymer fabricated by the same operation as described in the aforesaid example is as follows:

|  | Strength (g./d.) | Elongation (percent) | Knot strength (g./d.) | Recovery of elasticity at 5% elongation (percent) |
|---|---|---|---|---|
| Polypropylene | 5.4 | 20.1 | 4.5 | 100 |
| Polypropylene-polymethyl methacrylate | 5.6 | 18.1 | 4.9 | 100 |

As seen from the above table, there is almost no difference between the two in mechanical properties. However, although polypropylene has almost no affinity to disperse dyestuff, the fibre obtained in this example showed a high dyeability.

Example 17

6 parts of polyethyl methacrylate was added to 100 parts of crystalline poly-1-butene (melt-index 5.0), and this was mixed in the molten state, and was subjected to melt-spinning at the temperature of 210° C. By the same operation, resin to which polyethyl methacrylate was not added, was fabricated. Both were stretched by 4.5 times and were orientated. Comparison between them is as follows:

|  | Strength (g./d.) | Elongation (percent) | Knot strength (g./d.) |
|---|---|---|---|
| Polyethyl methacrylate not added | 3.75 | 17.2 | 2.43 |
| Polyethyl methacrylate added | 3.61 | 17.5 | 2.45 |

As seen from the above table, there is no difference between the two in mechanical properties, but an increase in the dyestuff absorption rate has been recognized.

Example 18

5 parts of polymethyl methacrylate was added to 100 parts of polyethylene manufactured under medium pressure method [specific gravity 0.95 (melt-index 1.5)], and 250 denier yarn was made by subjecting the mixture to melt-spinning with a nozzle of 0.5 mm. diameter at the temperature of 250° C. and stretched. By the same operation, yarn was made only from polyethylene. There was not much difference between the two fibres in mechanical properties, but the creep time of the mixed fibres, when a definite load was laid and left as it was, was longer as compared with that for pure polyethylene. That is, it was shown that the so-called creep characteristic was improved.

|  | Denier | Strength (g./d.) | Elongation (percent) | Creep time 1.5 g./d. (load cutting) (hrs.) |
|---|---|---|---|---|
| Polyethylene-polymethyl methacrylate | 250 | 6.5 | 18.0 | 150 |
| Polyethylene | 245 | 6.9 | 16.5 | 60-70 |

Example 19

5 parts of polycarbonate obtained by polycondensing 3 parts of polymethyl methacrylate, 4,4'-dioxydiphenyl-2,2'-propane (Bisphenol A) and phosgene was added to 100 parts of polypropylene (melt-index 2.0), and the mixture was subjected to melt-spinning at the temperature of 250° C. But in the measurement of melt-index, flow in 10 minutes under load of 10 kg. and the temperature of 190° C. was shown according to ASTM D-1238-52T. Likewise, polypropylene alone was subjected to melt-spinning. Obtained fibres were elongated by 4.5 times. Comparison between the mechanical properties of both fibres is as follows:

|  | Strength (g./d.) | Elongation (percent) | Knot strength (g./d.) | Recovery of elasticity at 5% elongation (percent) |
|---|---|---|---|---|
| Polypropylene | 5.5 | 21.0 | 4.3 | 100 |
| Mixed polypropylene | 5.3 | 20.2 | 4.2 | 100 |

The mechanical properties of the mixed fibre were almost the same as those of the pure fibre, but the mixed fibre did not show any waxy state on its surface, which is a defect of polypropylene fibre. This is an improvement. Then the fibre was subjected to naphthol dyeing according to a conventional process, and as a result, colors produced by dyeing were thick and fast, but in the case of using polypropylene alone, it was impossible to give sufficient dyeability. Further, as regards naphthol dyestuff, the base showed better results than the so-called salt.

Now an example of actual dyeing is mentioned. The weight of yarn is made standard, and 5% of first black HB base and 3% of naphthol AS-D are made soluble with alkali and are mixed, and then both are made to be absorbed by fibre for 90 minutes at the temperature of 100° C. and at a solution ratio of 1:30. It is effective to add a dyeing assistant at this time. Then the fibre is thrown into the second solution to which 2 g./l. of sodium nitrite and 3.5 g./l. of sulfuric acid have been added, and the solution is made to boil by heating it gradually, and the fibre is treated for about 15 minutes. Thus the fibre is dyed into thick black color. After the dyeing almost to discoloring is recognized even if it is treated by hydrosulfite and solution of a washing agent. The fastness degrees in this dyeing method were all above the 5 class.

*Example 20*

4 parts of polycarbonate which is a condensate of diphenyl carbonate and 4,4'-dioxy-diphenyl-2,2'-propane, and 4 parts of polyethyl methacrylate resin were mixed with 100 parts of crystalline polypropylene (melt-index 5.0), and fibre was obtained by subjecting the mixture to melt-spinning at the temperature of 230 to 240° C. and by stretching the yarn. The mechanical properties of the obtained fibre were as follows: strength 5 g./d., elongation 22.9%, knot strength 4.6 g./d. and recovery of elasticity at 5% elongation was 100%. This fibre was dyed by a normal process, using soluble vat dyestuff (Cibantine dye manufactured by Ciba Company), and the fibre was subjected to soaping after being oxidized with sulfuric acid-sodium nitrite. Thus fibre, whose fastness of color was above class 5 and whose color was light-meduim, was obtained.

*Example 21*

4 parts of polycarbonate which is obtained by condensating with phosgene and 5 parts of polymethyl methacrylate were mixed with 100 parts of crystalline polypropylene (melt-index 5.0), and the mixture was spun at the temperature of 245° C. The physical properties of the produced fibre were strength of 4.8 g./d., elongation of 24%, knot strength of 4.5 g./d. and recovery of elasticity at 5% elongation was 100%. It was possible to dye this fibre was naphthol dyestuff, vat dyestuff and sulfur dyestuff.

The aforesaid Examples 19 to 21 concern polypropylene, but these examples can be applied to those case wherein polyethylene or poly-1-butene is used.

*Example 22*

100 parts of polypropylene, 5 parts of polystyrene and 3 parts of polymethyl methacrylate were mixed, and the mixture was subjected to melt-spinning at the temperature of 240° C., and stretched by 3.5 times. By the same operation, pure polypropylene fibre was manufactured. Comparison between both in respect of their mechanical properties is as follows:

|  | Strength (g./d.) | Elongation (percent) | Knot strength (g./d.) | Recovery of elasticity at 5% elongation (percent) |
|---|---|---|---|---|
| Single fibre | 5.1 | 20.4 | 4.4 | 100 |
| 3 component fibre | 5.4 | 20.1 | 4.8 | 100 |

The single fibre had waxy feeling, and did not have affinity to dispersion dyestuff, while the fibre mixed with the aforesaid substances did not have any waxy feeling but showed fast colors although it was dyed with disperse dyestuff through a conventional process.

*Example 23*

100 parts of polypropylene, 5 parts of polystyrene and 3 parts of polyethyl methacrylate were mixed, and the mixture was converted into fibre by the same operation as described in Example 22. As in the case of Example 22, the feeling and dyeability of this fibre was improved, and it was recognized that there was not much difference between this fibre and pure fibre in respect of their mechanical properties as follows:

Strength (g./d.) _____ 5.6
Elongation (percent) _____ 18.4
Knot strength (g./d.) _____ 4.9
Recovery of elasticity at 5% elongation (percent) _ 100

*Example 24*

A mixture of 100 parts of polypropylene, 2.5 parts of polymethyl methacrylate and 5 parts of copolymer of acrylonitrile (30%) and styrene (70%) was subjected to melt-spinning at the temperature of 240° C. in the same manner as described in Example 22, and was converted into fibre. The feeling of the obtained fibre had been improved, and moreover had sufficient dyeability. Almost no change was recognized in respect of its mechanical properties. This fibre's properties were as follows:

Strength (g./d.) _____ 5.3
Elongation (percent) _____ 17.9
Knot strength (g./d.) _____ 4.8
Recovery of elasticity at 5% elongation (percent) _ 100

*Example 25*

5 parts of copolymer of acrylonitrile (30%) and styrene (70%), 3 parts of polymethyl methacrylate and 3 parts of polycarbonate resin comprising a condensate of Bisphenol A and phosgene were added to 100 parts of polypropylene, and the mixture was converted into fibre by subjecting the former to melt-spinning. This fibre not only had the aforesaid character but also showed thick color and fastness, having been dyed by naphthol dyestuff and vat dyestuff through a common method. The mechanical properties of this fibre were as follows:

Strength (g./d.) _____ 5.8
Elongation (percent) _____ 22.0
Knot strength (g./d.) _____ 4.9
Recovery of elasticity at 5% elongation (percent) __ 100

*Example 26*

2 parts of polymethyl methacrylate, 4 parts of copolymer comprising α-methylstyrene (70%) and methyl methacrylate (30%) and 2 parts of polycarbonate resin (polycondensate of 4,4'-dioxydiphenyl-1,1'-ethane and phosgene) were added to 100 parts of polypropylene, and this was mixed in the molten state, and then was converted into fibre by melt-spinning. And the mechanical properties of this fibre were as follows:

Strength (g./d.) _____ 6.4
Elongation (percent) _____ 24.0
Knot strength (g./d.) _____ 4.9
Recovery of elasticity at 5% elongation (percent) __ 100

The fibre could be thickly dyed and fast not only by disperse dyestuff but also naphthol dyestuff and vat dyestuff.

*Example 27*

3 parts of polycarbonate comprising a condensate of 4,4'-dioxy-diphenyl-1,1'-butane and phosgene, 2 parts of copolymer comprising styrene (70%) and acrylonitrile (30%), and 3 parts of polyethylmethacrylate resin were added to 100 parts of poly-1-butene, and the mixture was converted into fibre. The mechanical properties of this fibre, that is, strength, elongation and knot strength were 3.1 g./d., 28% and 2.5 g./d. respectively. The fibre showed good fastness and absorption to naphthol dyestuff, vat dyestuff and disperse dyestuff.

*Example 28*

3 parts of copolymer of styrene (70%) and methyl methacrylate (30%) was added to 100 parts of polyethylene (specific gravity 0.92) manufactured under high pressure method, and film was manufactured by inflation method. While film manufactured from polyethylene alone does not show printability, the present film could be printed fast without being subjected to any treatment.

Example 29

3 parts of styrene-acrylonitrile (70/30) copolymer, and 1 part of polyethyl methacrylate were added to 100 parts of polyethylene (specific gravity 0.95) manufactured under low pressure method, and the mixture was fabricated into monofilament by melt extrusion. By the same operation, monofilament of polyethylene alone was fabricated.

Comparison between both in respect of their mechanical properties is as follows:

|  | Strength (g./d.) | Elongation (percent) | Creep time at 2.0 g./d. load (hrs.) |
| --- | --- | --- | --- |
| Mixed fibre | 7.10 | 15.3 | 110 |
| Unmixed fibre | 6.85 | 19.0 | 24 |

As seen from the above table, creep characteristic with a defect of high orientation polyethylene fibre has been improved markedly.

Example 30

3 parts of polymethyl methacrylate and 2 parts of polycarbonate comprising a condensate of Bisphenol A and phosgene and 2 parts of polyester comprising a condensate of terephthalic acid with ethyleneglycol was mixed to 100 parts of polypropylene and the mixture was converted to fiber by subjecting to melt-spinning. Thus obtained fibre had been improved aforesaid character and good dyeability of cotton dyestuff, e.g., naphthol dyestuff, vat dyestuff, sulfur dyestuff by usual method and dyeing fastness is good.

The mechanical properties of this fibre were strength of 5.3 g./d., elongation of 26% and knot strength of 5.1 g./d. and recovery of elasticity at 5% elongation was 100%.

Example 31

3 parts of polycarbonate comprising a condensate of Bisphenol A and diphenyl-carbonate and 4 parts of copolymer comprising α-methylstyrene (30%) and methyl methacrylate (70%) and 2 parts of condensating polyester comprising terephthalic acid and 1.4-butandiol was added to 100 parts of polypropylene.

This mixture was subjected to melt-spinning and fabricated to fibre. This fibre having strength of 6.0 g./d., elongation of 16%, knot strength of 5.5 g./d. and recovery of elasticity was 100% and dyed with naphthol dyestuff, vat dyestuff fast by usual method.

What we claim is:

1. A polyolefin composition having superior dyeability comprising 100 parts crystalline polyolefin and 1–20 parts total of a mixture of both polycarbonate resin and polymethacrylic ester resin.
2. The polyolefin composition as claimed in claim 1 wherein the crystalline polyolefin is selected from the group consisting of polypropylene, poly-1-butene and polyethylene.
3. A polyolefin composition as claimed in claim 1 wherein the polycarbonate resin is a condensation product of bisphenol A and phosgene.
4. A polyolefin composition as claimed in claim 1 wherein the polycarbonate resin is a condensation product of bisphenol A and diphenyl carbonate.
5. A polyolefin composition as claimed in claim 1 wherein the polymethacrylate ester resin is polymethyl methacrylate.
6. A polyolefin composition as claimed in claim 1 wherein the polymethacrylate ester resin is polyethyl methacrylate.
7. A polyolefin composition as claimed in claim 1 wherein the polymethacrylate ester resin is a copolymer of methyl methacrylate and a methyl styrene.
8. The composition of claim 1 wherein the polycarbonate is a polymer formed by the reaction of a diphenyl alkane and a carbonyl compound.
9. The polyolefin composition of claim 1 wherein said composition is dyeable with dyestuffs for cotton.
10. The polyolefin composition of claim 9 wherein said dyestuffs are selected from the group consisting of naphthol, vat, soluble vat and sulfur dyestuffs.

References Cited

UNITED STATES PATENTS

| | | | |
| --- | --- | --- | --- |
| 2,843,567 | 7/1958 | Williams et al. | 260—873 |
| 2,882,263 | 4/1959 | Natta et al. | 260—93.7 |
| 3,065,190 | 11/1962 | Chisholm et al. | 260—897 |
| 3,107,228 | 10/1963 | Cappuccio et al. | 260—873 |
| 3,112,159 | 11/1963 | Cappuccio et al. | 8—55 |
| 3,121,070 | 2/1964 | Coover et al. | 260—897 |
| 3,156,743 | 11/1964 | Coover et al. | 260—897 |
| 3,230,029 | 1/1966 | Cappuccio et al. | 8—55 |
| 3,137,989 | 6/1964 | Fior et al. | 57—140 |

FOREIGN PATENTS

| | | |
| --- | --- | --- |
| 538,782 | 12/1955 | Belgium. |
| 236,385 | 8/1959 | Australia. |

OTHER REFERENCES

Raff et al.: "Polyethylene," vol. 11, High Polymer Series, Interscience Publishers, Inc. N.Y., pages 72–81.

GEORGE F. LESMES, *Primary Examiner.*

DANIEL ARNOLD, MURRAY TILLMAN, NORMAN G. TORCHIN, *Examiners.*

W. H. SHORT, J. W. SANNER, D. LEVY, J. T. GOOLKASIAN, *Assistant Examiners.*